United States Patent
Day et al.

(10) Patent No.: US 7,039,676 B1
(45) Date of Patent: May 2, 2006

(54) USING VIDEO IMAGE ANALYSIS TO AUTOMATICALLY TRANSMIT GESTURES OVER A NETWORK IN A CHAT OR INSTANT MESSAGING SESSION

(75) Inventors: Don Rutledge Day, Austin, TX (US); Rabindranath Dutta, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 1079 days.

(21) Appl. No.: 09/703,349

(22) Filed: Oct. 31, 2000

(51) Int. Cl.
*G06F 15/16* (2006.01)

(52) U.S. Cl. .............. 709/204; 382/103; 345/473; 348/169

(58) Field of Classification Search ........ 709/200–204; 382/103; 348/169
See application file for complete search history.

(56) References Cited

U.S. PATENT DOCUMENTS

| | | | |
|---|---|---|---|
| 5,732,232 A | 3/1998 | Brush, II et al. | |
| 5,880,731 A | 3/1999 | Liles et al. | |
| 5,884,029 A | 3/1999 | Brush, II et al. | |
| 5,894,307 A | 4/1999 | Ohno et al. | |
| 5,963,217 A | 10/1999 | Grayson et al. | |
| 6,038,493 A * | 3/2000 | Tow | 700/259 |
| 6,064,383 A | 5/2000 | Skelly | |
| 6,404,438 B1 * | 6/2002 | Hatlelid et al. | 345/473 |
| 6,453,294 B1 * | 9/2002 | Dutta et al. | 704/270.1 |
| 6,522,333 B1 * | 2/2003 | Hatlelid et al. | 345/474 |
| 6,539,099 B1 * | 3/2003 | Kellner | 382/103 |

OTHER PUBLICATIONS

Real-Time American Sign Language. http://vismod.www.media.mit.edu/tech-reports/TR-466/node2.html.

* cited by examiner

*Primary Examiner*—Jeffrey Pwu
(74) *Attorney, Agent, or Firm*—Marilyn Smith Dawkins

(57) ABSTRACT

The system, method, and program of the invention captures actual physical gestures made by a participant during a chat room or instant messaging session or other real time communication session between participants over a network and automatically transmits a representation of the gestures to the other participants. Image processing software analyzes successive video images, received as input from a video camera, for an actual physical gesture made by a participant. When a physical gesture is analyzed as being made, the state of the gesture is also determined. The state of the gesture identifies whether it is a first occurrence of the gesture or a subsequent occurrence. An action, and a parameter for the action, is determined for the gesture and the particular state of the gesture. A command to the API of the communication software, such as chat room software, is automatically generated which transmits a representation of the gesture to the participants through the communication software.

4 Claims, 5 Drawing Sheets

| GESTURE | STATE | ACTION | PARAMETER |
|---|---|---|---|
| LEFT TO RIGHT HAND WAVE | 1 | ANNOUNCE | HELLO FOLKS |
| LEFT TO RIGHT HAND WAVE | 2+ | ANNOUNCE | I'M STILL HERE |
| LAUGH | 1+ | SEND AUDIO | LAUGHTER |
| WINK | 1+ | SEND EMOTICON | ; ) |
|  |  |  |  |

FIG. 3

USING VIDEO IMAGE ANALYSIS TO AUTOMATICALLY TRANSMIT GESTURES OVER A NETWORK IN A CHAT OR INSTANT MESSAGING SESSION

BACKGROUND OF THE INVENTION

1. Field of the Invention

This invention relates to transmitting gestures in a chat session by participants communicating across a network of computers, and more specifically, to the use of a video camera to capture an actual physical gesture made by a participant, and automatically transmitting a textual or graphical representation of the captured gesture to the other participants in the chat session.

2. Description of the Related Art

As computational devices continue to proliferate throughout the world, there also continues to be an increase in the use of networks connecting these devices. Computational devices include large mainframe computers, workstations, personal computers, laptops and other portable devices including wireless telephones, personal digital assistants, automobile-based computers, etc. Such portable computational devices are also referred to as "pervasive" devices. The term "computer" or "computational device", as used herein, may refer to any of such device which contains a processor and some type of memory.

The computational devices may be connected in any type of network including the Internet, an intranet, a local area network (LAN) or a wide area network (WAN). The networks connecting computational devices may be "wired" networks, formed using lines such as copper wire or fiber optic cable, wireless networks employing earth and/or satellite-based wireless transmission links, or combinations of wired and wireless network portions. Many such networks may be organized using a client/server architecture, in which "server" computational devices manage resources, such as files, peripheral devices, or processing power, which may be requested by "client" computational devices. "Proxy servers" can act on behalf of other machines, such as either clients or servers.

A widely used network is the Internet. The Internet, initially referred to as a collection of "interconnected networks", is a set of computer networks, possibly dissimilar, joined together by means of gateways that handle data transfer and the conversion of messages from the sending network to the protocols used by the receiving network. When capitalized, the term "Internet" refers to the collection of networks and gateways that use the TCP/IP suite or protocols.

Currently, the most commonly employed method of transferring data over the Internet is to employ the World Wide Web environment, referred to herein as "the Web". Other Internet resources exist for transferring information, such as File Transfer Protocol (FTP) and Gopher, but have not achieved the popularity of the Web. In the Web environment, servers and clients effect data transfer using the Hypertext Transfer Protocol (HTTP), a known protocol for handling the transfer of various data files (e.g., text, still graphic images, audio, motion video, etc.).

Electronic mail, or e-mail, is a frequently used feature of the Internet which allows the sending of messages to anyone connected to the Internet or connected to a computer network that has a connection to the Internet, such as an online service. An Internet e-mail message is sent, using the Internet's TCP/IP protocol, as a stream of packets, where each packet contains the destination address of a mail server used by the intended recipient. When all of the packets reach the destination address, the mail server recombines them into an e-mail message that a recipient can read when the recipient accesses the recipient's mailbox at the mail server.

A more immediate way to communicate with others over the Internet is to participate in a "live" chat session. As a participant enters text via a keyboard, other participants to the chat session can see the text being entered immediately. A protocol called Internet Relay Chat (IRC) can be used between an IRC client communicating with an IRC server on the Internet to effectuate a chat session. A participant using a client logs onto a server and selects a channel on which the participant wants to chat. As a participant types a message on a keyboard, the message, as it is being entered, is sent to the server. The server is part of a global IRC server network, and sends the message to the other servers which send the message to all of the others participating on the same channel. Other chat sessions can be effectuated without using the IRC protocol. For example, proprietary chat software can be used by individual Web sites to enable visitors to the site to communicate with each other in a live chat session.

Instant messaging is another way to communicate with other participants in "real time". Instant messaging is different from the live chat sessions discussed above in that instant messaging enables a participant to communicate privately with another person. A user can create special lists of "buddies". When a "buddy" comes on line, the other buddies are notified. They can then participate in communicating with each other.

It should be noted that although these "real time" forms of communicating are referred to as "chat" sessions; the communication is in the form of transferring inputted text, such as via a keyboard, and does not typically include "auditory", i.e., voice, communication.

It is possible, however, to communicate in an auditory fashion over the Internet network, also. In this way, the sound of the participants' voices are broken down into packets which are then delivered using the Internet's TCP/IP protocols. Auditory communication over the Internet can be carried out in many ways. In one way, referred to as Internet telephony, the communication is made in a manner similar to a telephone, but the call is routed over the Internet instead of through the phone service. In another way, the communication is carried out through computers, connected to the Internet, having special hardware (e.g., microphones, speakers, etc.) and software. In this way, not only may audio communication be made, but text or graphics may also be sent between the participants using the computer's display monitor and other attached input and output devices. In addition, systems are also known in prior art to utilize a camera as a computer input device to communicate video images and audio over the Internet.

Regardless of these other types of video or audio communication means, the most prevalent communications means at the present time utilizes typed text such as is used in chat sessions or instant messaging as discussed above. The problem with typed text, however, is that all that is communicated are the words themselves. The words themselves do not necessarily communicate all of the information that can be conveyed in a real live conversation which the live Internet chat session is trying to model. Typically, in a face to face communication, a person listens to the tone of the communicated words, and observes any associated body language, in order to interpret the meaning of the communication and to gather all of the communicated message. This is absent in chat sessions and instant messaging.

To compensate for this, emoticons are frequently used. Emoticons have emerged in connection with live chat sessions and instant messaging in order to enable a participant to further communicate the participant's tone, emotion, or feelings in connection with any typed words that are communicated. For example, :) is an emoticon which conveys that the participant sending the communication is smiling or happy. This can be used to inflect a sarcastic or joking statement to communicated words. Likewise, the emoticon conveys an "unhappy" emotion such as sadness or disappointment or dislike in something that was communicated. The emoticon :-D may be used to indicate that the person is laughing; and the emoticon ;-) may be used to indicate that what the person said was said with a wink. A wide range of other emoticons are also known and used.

Avatars are also used in chat room software. An avatar is a graphical animation that represents a participant. An avatar comes and goes from the display screen of the participants as the participant that it represents comes and goes from the chat session.

As shown above, emoticons are used frequently in live chat sessions on the Internet to convey gestures, such as a smile, a wink, a frown, etc. Unfortunately, a participant has to first contemplate the type of gesture that the participant is making (e.g., the participant may have to momentarily stop to think "Am I smiling?", "Is my head nodding in agreement?", etc.); and then type in a combination of characters to create an emoticon to reflect that gesture. Likewise, for avatars, specific scripts or commands have to be selected by a participant in order to control the presentation or animation of the avatar to the other participants. It would therefore be desirable if gestures could be conveyed in a live chat session or instant messaging communication in a more automated fashion in order to immediately convey the actual gestures being made by a participant. Presently, there has not been a way to automatically convert an actual physical gesture of a participant in a chat-room to a form that can command the chat room software.

SUMMARY OF THE INVENTION

It is therefore an object of the invention to automatically generate a representation of an actual physical gesture made by a participant in a "real time" communication over the network.

The system, method and program of the invention automatically generates input into chat room software that represents an actual physical gesture made by a participant in a real time communication over a network, such as a "live" chat session or an instant messaging communication. The system comprises automatic gesture software in combination with image processing software that can analyze captured video frames. A video camera, utilized in connection with the participants' computer system, captures the real time gestures made by the participant, such as a wave, a shoulder shrug, a nodding of the head, and inputs the captured video images into the computer system of the participant. The image processing software analyzes the captured video images, received as input, of a participant. When a gesture is depicted, the computer system accesses a database to find a corresponding graphic or text translation, such as an emoticon or a text description or animation of an avatar, and inserts the translation into the participants' dialogue in the live chat session in accordance with the command interface to the chat room software. For example, in this way, a representation of the gesture is automatically generated and can be inserted within a communication from one participant to each of the other participants in an on-line chat session within the network of computers.

It should be noted that the present invention may also be implemented in audio communications made over the computer network wherein the translated gesture is displayed on a display device in conjunction with the audio communication. Although it is foreseeable that technology will support full audio and video image transmissions for chat rooms, it is anticipated that at least some chat rooms will continue to be carried out without such technology in order to protect the anonymity of the participants. In this regard, the automatic transmission of gestures of the present invention will continue to be advantageous.

In addition to the advantage of being able to automatically transmit a translation of a chat room participant's actual physical gestures, another advantage of the present invention also exists. With the present invention, cultural dependent gestures are interpreted at the context of the user thereby minimizing any chance of misunderstanding. For example, the victory "V" sign, which is a vulgarity in Australia and Latin countries, would be interpreted as "victory" and transmitted as such with the appropriate action for "victory".

BRIEF DESCRIPTION OF THE DRAWINGS

For a more complete understanding of the present invention and the advantages thereof, reference should be made to the following Detailed Description taken in connection with the accompanying drawings in which:

FIG. 3 illustrates an exemplary table of gestures with associated actions;

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

Figure 1A:
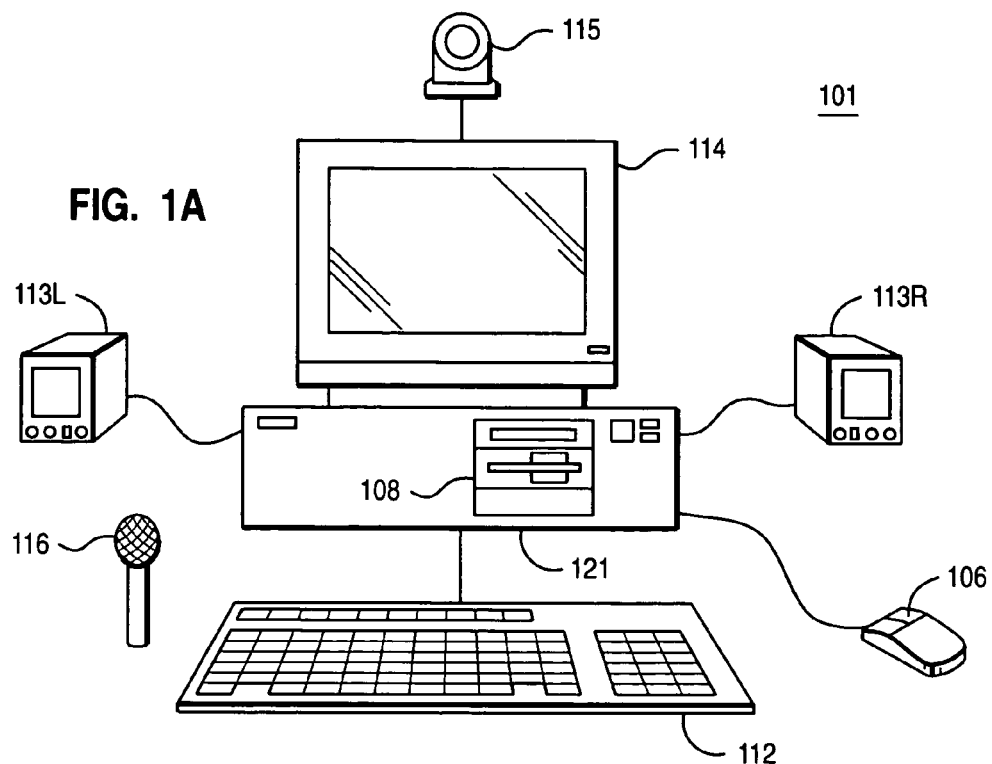
FIG. 1A illustrates the hardware components of a computer system for a participant using chat room software and the automatic gesture software of a preferred embodiment of the present invention.

With reference now to the figures, a preferred embodiment of the invention is described. FIG. 1A illustrates the hardware components of a computer system for a participant using chat room software and the automatic gesture software of a preferred embodiment of the present invention. The computer system comprises a processing system unit 121 with connections to a video camera 115, a display monitor 114, keyboard 112, and mouse 106. Video camera 115 may be a digital video input device or a conventional analog video camera connected to a video capture device, which are known in the art. Also included are storage devices 108, which may include floppy drives and other types of permanent or removable storage devices. Optional input/output devices may include speakers 113L, 113R, and microphone 116. Speakers become necessary in those embodiments where an action for a gesture produces sound. Alternatively, speakers 113L and 113R may be replaced with headphones or other audio output devices. Likewise, a microphone may become necessary if a participant configures a gesture to have an associated sound as produced at the participant's system. The associated sound could also be directly transmitted without the microphone. As such, the microphone may be replaced by with other audio input devices such as a digital music keyboard or synthesizer. It should be noted, also, that the speakers and microphone become necessary in those embodiments wherein the communication between participants over the network includes audio communication. Other input/output devices may also be attached to system 101 such as modems, printers, etc.

Figure 1B:
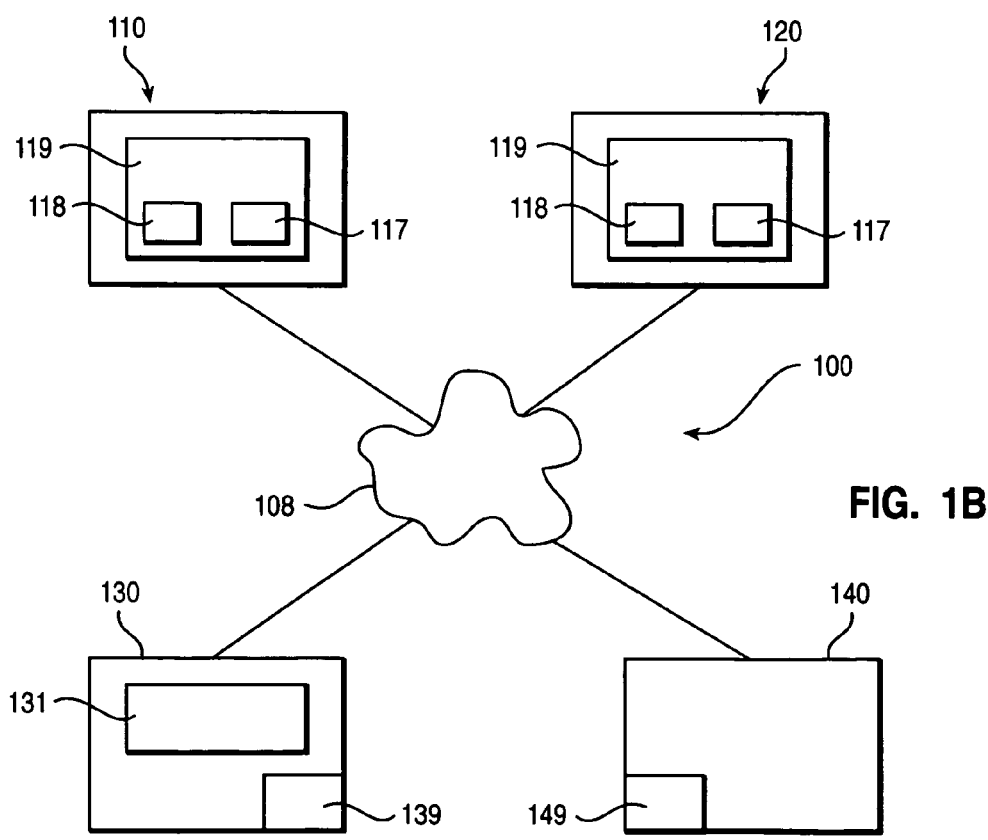
FIG. 1B illustrates the software components of a network of computers including at least two computer systems which enable a participant at each computer system to communicate with other participants over the network by utilizing the automatic gesture software of a preferred embodiment of the present invention.

FIG. 1B illustrates the software components of a network of computers including at least two computer systems which enable a participant at each computer system to communicate with other participants over the network by utilizing the automatic gesture software of a preferred embodiment of the present invention. Data processing system network 100 includes at least two computer systems (e.g., client computer systems) 110, 120 which enable a participant at each computer system to communicate with each other and other participants over the network 108. Data processing network 100 also includes one or more servers 130, 140 which are accessible as part of the Internet 108 or other network. Computer systems 110, 120 are enabled to access servers 130, 140. At least one of the servers 130, hosts a Web site 131 that utilizes chat software. Examples of chat software include a) "ichat" which is client and server software for accessing and running chat sites (IRC, MUDs, telenet) with extensions including World Wide Web (WWW) integration (see ichat.com); b) "chatblazer" which is chat software for Web sites (see chatblazer.com); and c) "volanochat" which is client and server Java software for providing chat at Web sites or running a world wide chat network from Volano (see volano.com). Other software is also currently available to provide a chat session over a network, e.g., the Internet.

It should also be noted that content on the servers 130, 140 may be accessed by clients 110, 120 using any of a variety of messaging system protocols including Hypertext Transfer Protocol (HTTP), File Transfer Protocol (FTP), Network News Transfer Protocol (NNTP), Internet Mail Access Protocol (IMAP), Internet Relay Chat (IRC), or Post Office Protocol (POP), etc.

In accordance with the present invention, clients 110, 120 within data processing system network 100 each includes a messaging system client application 119 (e.g., a browser), capable of transmitting and receiving messages containing commands to and from a messaging system server application 139, 149 within servers 130, 140, respectively. Commands may be issued by client application 110 to server application 139 in order to cause some operation to be performed by server 130. Client 110 may execute one or more user applications 118, either within browser application 119 or apart from browser application 119, which are capable of sending and retrieving data over the Internet 108 to and from servers 130 or 140. Such user application(s) 118 includes client side chat software or other client side software that enables the participant at client 110 to communicate with other participants over the network, e.g., via a server 130. Either in combination with or separate from software 118 is client side software 117 which enables video images from video camera 115 to be captured and analyzed for any one of a plurality of gestures made by participant. Software 117 furthermore determines a chat room command, e.g., a graphic or text representation, of the gesture and sends it via the communication sent from the participant using chat software 118.

Likewise, client 120 has similar hardware components as for client 110 (such as client 101 in FIG. 1A), and similar software components including a browser application 119, chat room software 118, and automatic gesture software 117.

Automatic gesture software 117 comprises image processing and computer vision software to analyze images from video camera 115. One source of image processing and computer vision software is Amerinex Applied Imaging which specializes in computer vision products such as Aphelion and KBVision (see their Web site on the World Wide Web (WWW) using the HTTP protocol at aai.com). The imaging software analyzes various features of a participant from captured video frames generated by video camera 115. For example, the imaging software may discern any one or more of the following features including, but not limited to, the head, eyes, mouth (lips), shoulders, arms, and hands. For example, the imaging software can detect whether the head nods up and down in successive frames, or if there is a prolonged "wink" in one eye, or if the mouth makes a smile or frown, or if the shoulders "shrug", or if an arm or hand moves across the captured video frames such as in depicting a wave or other gesture.

Automatic gesture software 117 also comprises a scripting language for describing the gestures and relating them to commands such as chat software commands. The scripting language has recognition events and corresponding actions. In a preferred embodiment the syntax takes the following form:

command (state, action (parameters for the action))

For example, if the imaging software detects a left to right wave, then the scripting language will define this as a command having an action of announcing "hello, folks" where "hello folks" is the parameter for the announce action. This parameter is used if the state is equal to 1, meaning that this is the first time that the imaging software depicted a wave from the left to the right. As such, for this example, the automatic gesture software would generate the following:

on LeftToRightWave(1,announce("hello,folks"))

As such, when the participant waves a hand left to right for the first time (state 1 being the initial state), the automatic gesture software converts this into chat room parlance—"hello, folks". Depnding upon the embodiment, and/or depending upon selection options offered to the participant by the automatic gesture software, the physical gesture can be converted either into an auditory communication (i.e., by announcing "hello, folks," or by a textual communication such as by inserting text into the written conversation stating that participant #X states "hello, folks," or by sending a graphic image of an arm waving to be displayed on the participants' graphic display monitor. In addition, some chat software shows a graphical representation or animated avatar of each participant participating in the chat room. As such, the command from the physical gesture could be to wave the arm in the animation of the participant displayed on the monitor.

As a further example, if the imaging software subsequently depicts another waving of the hand from left to right, the automatic gesture software would take the action to announce or insert text or graphic into the communication to indicate in chat room parlance—"Yeah, I'm still here". The recognition event and corresponding action may be depicted by the scripting language as on LeftToRightWave(*,announce("Yeah, I'm still here."))
    where * is any subsequent state after the initial (1) state.

It should be noted that the above described scripting language is for illustrative purposes, and that other embodiments may utilize a scripting language constructed in another way and format while still being within the breadth and scope of the present invention.

Figure 2:
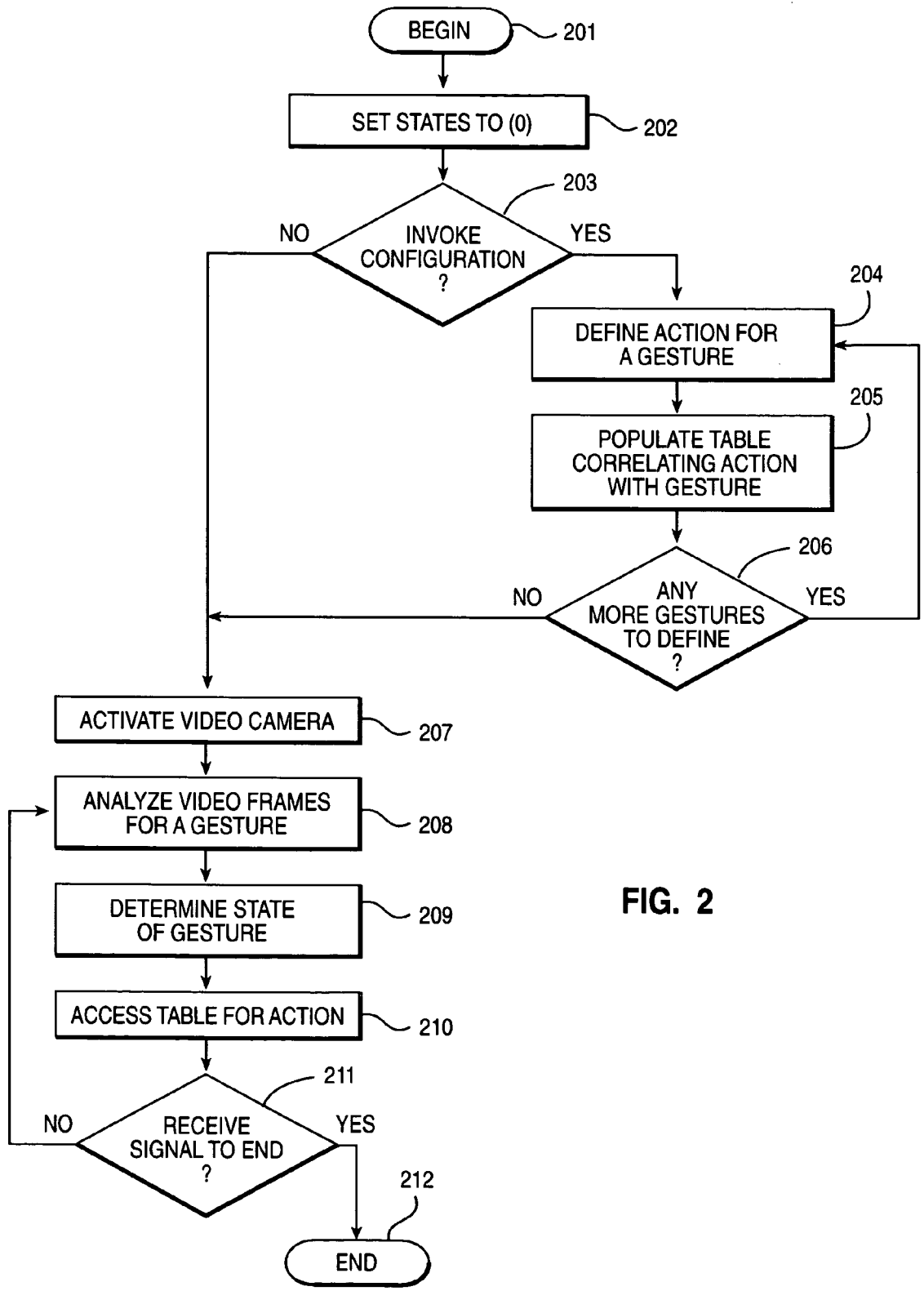
FIG. 2 illustrates logic for automatically transmitting gestures over a network.

FIG. 2 illustrates the logic of a preferred embodiment of the invention. When the gesture software is invoked, 201, then all states are set to zero (0), 202. Upon each invocation of the automatic gesture software, the scripting language is initialized in order to set up the gesture recognition state. For example, all states are initialized to zero in order to then determine when a gesture has a first occurrence. This is important since a different action or translation of the gesture may be made depending upon whether it is a first or a subsequent occurrence of the gesture.

The gesture software can be automatically invoked whenever the participant begins a chat session, or it can be invoked upon selection by the participant. In addition, the gesture software can be disabled (and then enabled) at any time during a chat session which will not affect the initialization states. The gesture software can be disabled because there may be times during a chat session that the participant does not want the gestures to be automatically transmitted. For example, another person may enter into the same physical room as the participant which the participant begins communicating with while breaking away momentarily from the on-line chat session.

After the gesture software is invoked, and the initialization states are set, it is then determined whether or not to invoke the configuration process, 203. The configuration process may take place upon initial installation of the software product on the participant's computer or at any time the participant invokes the software. Of course, once configured, the participant may skip the configuration process for any given invocation if the gestures and correlated actions are set as desired by the participant. Furthermore, if the automatic gesture software is already preprogrammed with all of the possible gestures and correlated actions; no configuration is necessary, or even provided, in some embodiments.

Otherwise, the participant is prompted as to whether or not configuration is desired. The configuration process, in some embodiments, may consist of performing a gesture for the video camera and then designating the interpretation of the gesture including an interpretation based upon when the gesture occurs. Depending upon the embodiment, the automatic gesture software may provide a set of available gestures, e.g., wave hand, smile, frown, wink, shrug, nod, for which the user may designate the action (announce, insert text, insert graphic,) and the parameter of the action (e.g., the content or translation of the gesture).

Other embodiments may be virtually limitless in the gestures that the participant may make and how they may be defined or translated. For example, in some embodiments, the GUI of the automatic gesture software for the configuration task may display to the user a still video frame of the user captured at that time from the video camera. The user could then select a feature, such as the mouth, hand, eye, shoulders, head, etc. The GUI would then ask the user to make a gesture using the selected feature. The automatic gesture software then analyzes the changes in the selected feature throughout a sequence of captured video frames of the user making the gesture. The GUI then prompts the user to designate a corresponding action such as insert laugh, announce "hello, folks", announce "just kidding", announce "yes, I agree", etc., for the gesture, 204. As such, the automatic gesture software can be configured to correlate a gesture with an action. The user can then further specify the corresponding action in relation to the state of the gesture, i.e., whether it is a first occurrence or a subsequent occurrence. Note, however, that there can be more states than just "first" and "other" occurrence. For example, additional states may include "any, first, last, non-first, non-last, null, ifactive, ifinactive," all of which are dependent on actual states that a particular application may support.

Then the configuration process stores, in a table, 300, as shown in FIG. 3, the gesture with the corresponding action, 205, (FIG. 2). As such, at the end of the configuration process, an associative table, which maps the gesturing events to the appropriate scripting command, is populated. That is, since the configuration process has defined each gesture with a corresponding action, a database or table 300 (FIG. 3) becomes populated with the gesturing events 301, state of gesture 302, and corresponding action 303 and parameter of the action 304, i.e., the content to be transmitted for the gesturing event.

Referring back to FIG. 2, the automatic gesture software then asks the participant if there are any more gestures that the user wishes to define, 206. If there are, the GUI prompts the participant as stated above and reiterates steps 204–206. Otherwise, the automatic gesture software ends the configuration process, and the camera is deactivated.

As mentioned above, depending upon the embodiment, the automatic gesture software may either provide a predetermined set of gestures already predefined so that the configuration process is eliminated; or the automatic gesture software may allow the predetermined set of gestures to be tailored as to the corresponding action desired by the user; or the automatic gesture software may allow virtually any gesture to be made and defined in any way so desired by the user. For example, the software may allow a user to define a new gesture using the scripting language. Upon compiling the definition, the software is instructed, (e.g., by the word "watchme" as used below), to invoke a training session to associate the user's actual gesture with this new definition. Thereafter, it can be used to augment the predefined vocabulary of gestures, such as:

definecesture ("deep frown",watchme)

.

.

onGesture["deep frown"](*,announce("I don't know about that!!))

Some embodiments may also add a censoring feature in order to set a certain standard as to the content of a user defined action. The censoring feature may further have a selectable feature in order to set any content to a level of appropriateness based upon age of a child, or the environment, such as a religious environment or a business environment.

After the gesture recognition state is initialized 202, and the configuration process, if any, is completed 203–206; the video camera is activated and starts taking video images of the participant 207. As the recording of the video begins, the image processing software of the automatic gesture software analyzes captured video frames of the participant looking for known gesturing events. In essence, the image processing software looks for similar changes in the video frames of the selected features as defined during configuration and set up. For example, a user may want to define a wink as a gesture. As such, the user may designate the eye as one of the features. The image processing software would then analyze a sequence of captured video frames to determine when an eyelid is in the closed position in a range of 1–3 seconds to differentiate between an intended wink as a gesture and the normal blinking of an eyelid which remains shut for a relatively smaller amount of time than 1 second. To determine this, the image processing software would analyze various captured video frames covering a second or more in time to determine if an eyelid remained closed during such an interval. If so, the image processing software would then determine from the video analysis that a wink gesturing event occurred.

Upon determination that a gesturing event occurred 208, the automatic gesture software would determine the state of the gesturing event, i.e., whether it is the first occurrence of the event since initialization or a subsequent event 209. The automatic gesture software would then access an associative mapping, e.g., a database of gestures, and find the corresponding action and parameter of the action, i.e., the content to be transmitted, for the gesture and the state of the gesture 210. For example, if the gesturing event is a left to right hand wave, then depending upon the current state, the gesturing event is mapped to a command inputted to the chat room software. As such, for a gesture associated with the on LeftToRightWave state, the appropriate action part is selected and executed based on the sequence or other open states. For example, "announce" action may equate to the execution of "send this string across the network to other participants."

A diagrammatic representation of these steps is:
gesture->command(state)-> action with chat room software
where "action with chat room software" is typically an alternative interface to keyboard-actuated or mouse-actuated functionality in the software. The default interface when the user types some text and presses the Enter key is "send" or "announce." The software may provide buttons or pull-down selection of graphics to be transmitted to indicate emotion, so these functions may effectively represent gesture vocabulary for "smile" or "laugh".

In this manner, instead of merely typing the cryptic phrase "ROTFL", the gesture-aware software may recognize the user's laughing behavior and send the more complete text, "I'm rolling on the floor, laughing!"

The gesture software continues to analyze captured video frames to determine a gesturing event 208–210 until a signal event to end is received 211, which ends the logic 212. Depending upon the type of signal received, the process will either begin again at step 201 upon invocation, or at step 207 if the signal was to merely stop the activation of the video camera momentarily as discussed previously.

Figure 4:
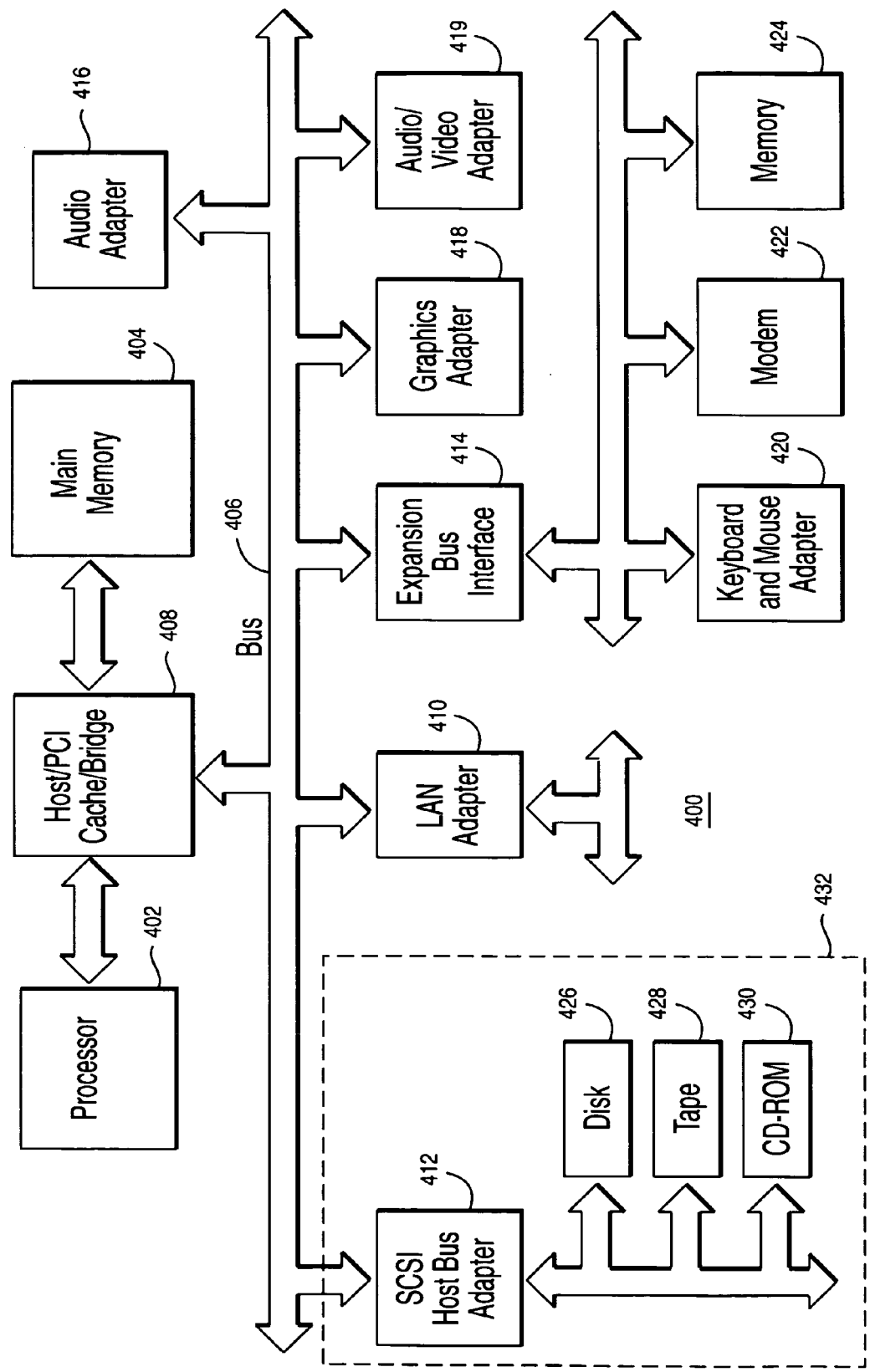
FIG. 4 illustrates a block diagram of a data processing system in which the present invention may be implemented.

With reference now to FIG. 4, a block diagram of a data processing system is shown in which the present invention may be implemented. Data processing system 400 is an example of a computer, such as computer 101 in FIG. 1A, in which code or instructions implementing the process of the present invention may be located. Data processing system 400 employs a peripheral component interconnect (PCI) local bus architecture. Although the depicted example employs a PCI bus, other bus architecture such as Accelerated Graphics Port (AGP) and Industry Standard Architecture (ISA) may be used. Processor 402 and main memory 404 are connected to PCI local bus 406 through PCI bridge 408. PCI bridge 408 also may include an integrated memory controller and cache memory for processor 402. Additional connections to PCI local bus 406 may be made through direct component interconnection or through add-in boards. In the depicted example, local area network (LAN) adapter 410, small computer system interface SCSI host bus adapter 412, and expansion bus interface 414 are connected to PCI local bus 406 by direct component connection. In contrast, audio adapter 416, graphics adapter 418, and audio/video adapter 419 are connected to PCI local bus 406 by add-in boards inserted into expansion slots. Expansion bus interface 414 provides a connection for a keyboard and mouse adapter 420, which may be a serial, PS/2, USB or other known adapter, modem 422, and additional memory 424. SCSI host bus adapter 412 provides a connection for hard disk drive 426, tape drive 428, and CD-ROM drive 430. Typical PCI local bus implementations will support three or four PCI expansion slots or add-in connectors.

An operating system runs on processor 402 and is used to coordinate and provide control of various components within data processing system 400 in FIG. 4. The operating system may be a commercially available operating system such as Windows 98 or Windows 2000, which are available from Microsoft Corporation. Instructions for the operating system and applications or programs are located on storage devices, such as hard disk drive 426, and may be loaded into main memory 404 for execution by processor 402.

Those of ordinary skill in the art will appreciate that the hardware in FIG. 4 may vary depending on the implementation. Other internal hardware or peripheral devices, such as flash ROM (or equivalent nonvolatile memory) or optical disk drives and the like, may be used in addition to or in place of the hardware depicted in FIG. 4. Also, the processes of the present invention may be applied to a multiprocessor data processing system.

For example, data processing system 400, if optionally configured as a network computer, may not include SCSI host bus adapter 412, hard disk drive 426, tape drive 428, and CD-ROM 430, as noted by dotted line 432 in FIG. 4 denoting optional inclusion. In that case, the computer, to be properly called a client computer, must include some type of network communication interface, such as LAN adapter 410, modem 422, or the like. As another example, data processing system 400 may be a stand-alone system configured to be bootable without relying on some type of network communication interface, whether or not data processing system 400 comprises some type of network communication interface. As a further example, data processing system 400 may be a Personal Digital Assistant (PDA) device which is configured with ROM and/or flash ROM in order to provide nonvolatile memory for storing operating system files and/or user-generated data.

The depicted example in FIG. 4 and above-described examples are not meant to imply architectural limitations. For example, data processing system 400 also may be a notebook computer or hand held computer or a telephony device.

The processes of the present invention are performed by processor 402 using computer implemented instructions, which may be located in a memory such as, for example, main memory 404, memory 424, or in one or more peripheral devices 426–430.

Figure 5:
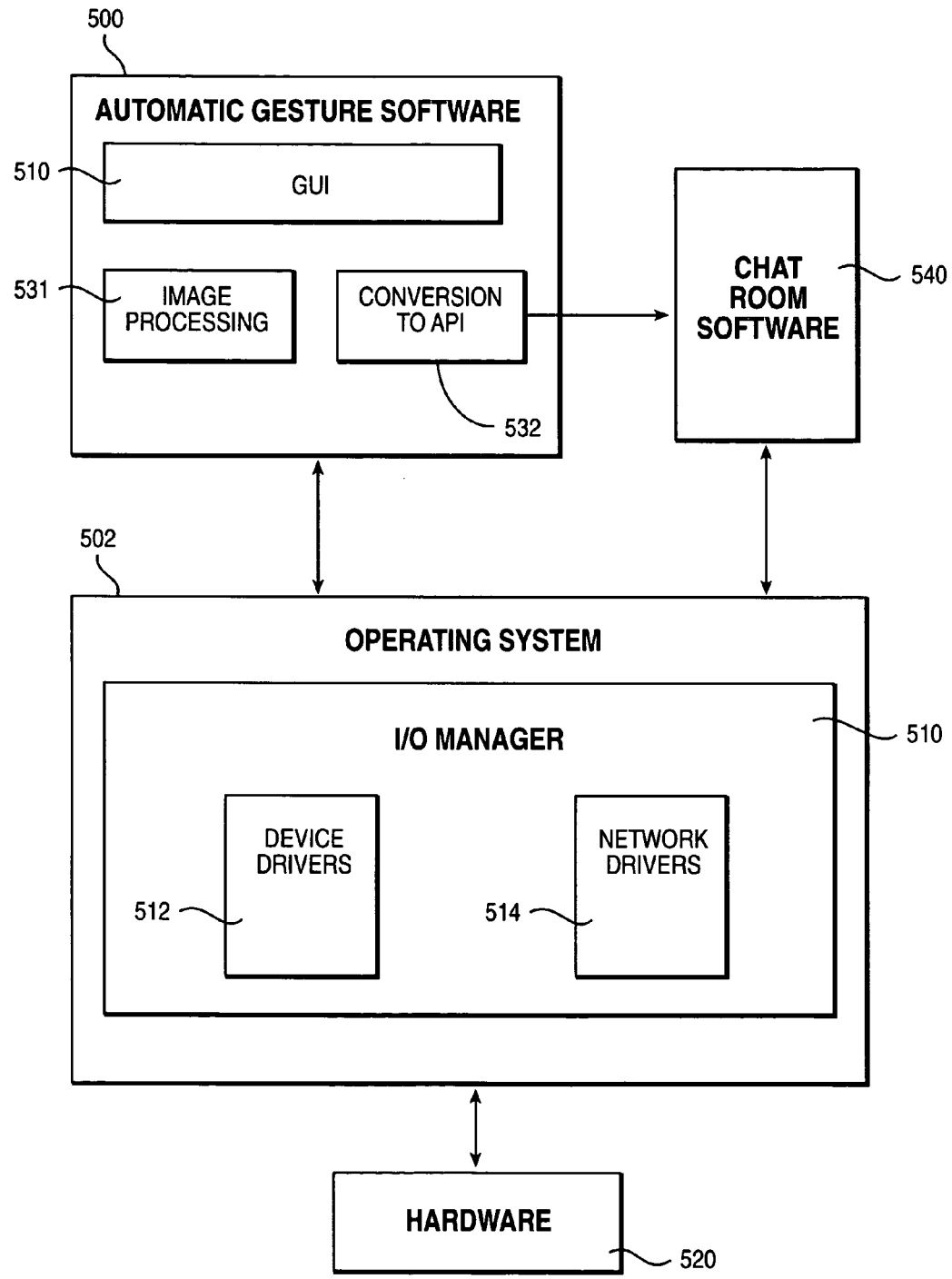
FIG. 5 is a block diagram illustrating a software organization within a data processing system in accordance with a preferred embodiment of the present invention.

With reference now to FIG. 5, a block diagram is shown illustrating the software organization within data processing system 400 in FIG. 4 in accordance with a preferred embodiment of the present invention. Operating system 502 communicates with automatic gesture software 500. The operating system communicates with hardware 520 directly through input/output (I/O) manager 510. I/O manager 510 includes device drivers 512 and network drivers 514. Device drivers 512 may include a software driver for a printer or other device, such as a display, fax, modem, sound card, etc. The operating system receives input from the user through hardware 520. Automatic gesture software 500 sends information to and receives information from a network, such as the Internet, by communicating with network drivers 514 through I/O manager 510. The automatic gesture software 500 may be located on storage devices, such as hard disk drive 426, and may be loaded into main memory 404 for execution by processor 402, as shown in FIG. 4.

In this embodiment, automatic gesture software 500 includes a graphical user interface (GUI) 510, which allows the user to interface with the software 500. This interface provides for selection of various functions through menus and allows for manipulation of elements displayed within the user interface by use of a mouse or other input device. For example, a menu may allow a user to perform various functions including configuring and correlating gestures with actions, and initiating or terminating the video processing.

Automatic gesture software 500 also includes image processing software 531, as described previously herein, which receives input from hardware device 520, i.e., a video camera, via the I/O manager 510 and operating system 502. When automatic gesture software determines that image processing software 531 has identified a gesturing event, the automatic gesture software converts the gesture 532 to an API of chat room software 540.

The exemplary embodiments shown in the figures are provided solely for the purposes of explaining the preferred embodiments of the invention; and those skilled in the art will recognize that numerous variations are possible, both in form and function.

The preferred embodiments may be implemented as a method, system, or article of manufacture using standard programming and/or engineering techniques to produce software, firmware, hardware, or any combination thereof. The term "article of manufacture" (or alternatively, "computer program product") as used herein is intended to encompass data, instructions, program code, and/or one or more computer programs, and/or data files accessible from one or more computer usable devices, carriers, or media. Examples of computer usable mediums include, but are not limited to: nonvolatile, hard-coded type mediums such as CD-ROMs, DVDs, read only memories (ROMs) or erasable, electrically programmable read only memories (EEPROMs), recordable type mediums such as floppy disks, hard disk drives and CD-RW and DVD-RW disks, and transmission type mediums such as digital and analog communication links, or any signal bearing media. As such, the functionality of the above described embodiments of the invention can be implemented in hardware in a computer system and/or in software executable in a processor, namely, as a set of instructions (program code) in a code module resident in the random access memory of the computer. Until required by the computer, the set of instructions may be stored in another computer memory, for example, in a hard disk drive, or in a removable memory such as an optical disk (for use in a CD ROM) or a floppy disk (for eventual use in a floppy disk drive), or downloaded via the Internet or other computer network, as discussed above. The present invention applies equally regardless of the particular type of signal-bearing media utilized.

The foregoing description of the preferred embodiments of the invention has been presented for the purposes of illustration and description. It is not intended to be exhaustive or to limit the invention to the precise form disclosed. Many modification and variations are possible in light of the above teaching. For example, although preferred embodiments of the invention have been described in terms of the Internet, other network environments including but not limited to wide area networks, intranets, and dial up connectivity systems using any network protocol that provides basic data transfer mechanisms may be used. Also, although the preferred embodiment has been described with reference to chat room software, the preferred embodiment may also be used in conjunction with other software for enabling other types of communication such as instant messaging, telephony communication, other audio communication, conferencing, etc.

It is intended that the scope of the invention be limited not by this detailed description, but rather by the claims appended hereto. The above specification, examples and data provide a complete description of the manufacture and use of the system, method, and article of manufacture, i.e., computer program product, of the invention. Since many embodiments of the invention can be made without departing from the spirit and scope of the invention, the invention resides in the claims hereinafter appended.

Having thus described the invention, what we claim as new and desire to secure by Letters Patent is set forth in the following claims.

The invention claimed is:

1. A method for interacting between participants through a network of computers, comprising:
    analyzing successive video images received as input from a camera capturing video of at least one of the participants for an actual physical gesture made by the one participant;
    determining a state of the actual physical gesture made by the one participant;
    accessing a table for an action associated with the determined state of the actual physical gesture; and
    automatically generating a command for the action to a software program enabling a real time communication between the participants thereby sending a representation of the actual physical gesture within the real time communication.

2. A method for communicating between participants through a network of computers, comprising:
    analyzing images of at least one of the participants received as input for an actual physical gesture;
    associating each of a plurality of physical gestures to separate commands of an application program interface for communicating in real time between the participants; and
    transmitting an associated command associated with the actual physical gesture from the analyzed images to the application program interface to send a representation of the actual physical gesture within the real time communication for communicating between the participants.

3. A computer system having means for interacting between participants through a network of computers, comprising:
    means for analyzing successive video images received as input from a camera capturing video of at least one of the participants for an actual physical gesture made by the one participant;

means for determining a state of the actual physical gesture made by the one participant;
 means for accessing an associative mapping for an action associated with the determined state of the actual physical gesture; and
means for automatically generating a command for the action to a software program enabling a real time communication between the participants thereby sending a representation of the actual physical gesture within the real time communication.

4. The system of claim 3 wherein the associative mapping is a table.

* * * * *

UNITED STATES PATENT AND TRADEMARK OFFICE
CERTIFICATE OF CORRECTION

| | | |
|---|---|---|
| PATENT NO. | : 7,039,676 B1 | Page 1 of 1 |
| APPLICATION NO. | : 09/703349 | |
| DATED | : May 2, 2006 | |
| INVENTOR(S) | : Don Rutledge Day et al. | |

It is certified that error appears in the above-identified patent and that said Letters Patent is hereby corrected as shown below:

Column 8, Line 48, delete "definecesture" and substitute with --defineGesture--.

Signed and Sealed this

Seventeenth Day of October, 2006

JON W. DUDAS
*Director of the United States Patent and Trademark Office*